United States Patent
Yu

(10) Patent No.: US 10,122,937 B2
(45) Date of Patent: Nov. 6, 2018

(54) METHOD AND APPARATUS FOR PROCESSING IMAGE OBTAINED BY CAMERA

(71) Applicant: SAMSUNG ELECTRONICS CO., LTD., Suwon-si, Gyeonggi-do (KR)

(72) Inventor: Sang-jun Yu, Gwacheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/467,097

(22) Filed: Mar. 23, 2017

(65) Prior Publication Data
US 2017/0280041 A1    Sep. 28, 2017

(30) Foreign Application Priority Data

Mar. 28, 2016   (KR) .................. 10-2016-0036963

(51) Int. Cl.
*H04N 5/235*    (2006.01)
(52) U.S. Cl.
CPC ................................ *H04N 5/2357* (2013.01)
(58) Field of Classification Search
CPC .................................................. H04N 5/2357
See application file for complete search history.

(56) References Cited

U.S. PATENT DOCUMENTS

| 6,710,818 B1* | 3/2004 | Kasahara ............... H04N 5/235 348/226.1 |
| 7,633,533 B2* | 12/2009 | Cho ..................... H04N 5/2357 348/226.1 |
| 8,970,716 B2 | 3/2015 | Kodama |
| 2009/0316020 A1* | 12/2009 | Ezawa .................. G06T 7/0004 348/226.1 |
| 2011/0096193 A1* | 4/2011 | Egawa ................... H04N 5/235 348/226.1 |

FOREIGN PATENT DOCUMENTS

| KR | 10-2015-0109177 | 10/2015 |
| WO | WO 2015/141925 | 9/2015 |

OTHER PUBLICATIONS

Wikipedia, Rolling_shutter (http://en.wikipedia.org/wiki/Rolling_shutter) last modified Feb. 11, 2017, 2 pages.

* cited by examiner

*Primary Examiner* — Jason A Flohre
(74) *Attorney, Agent, or Firm* — Nixon & Vanderhye P.C.

(57) ABSTRACT

A method of processing an image obtained by a camera includes: obtaining the image using an image sensor; identifying an image signal in a direction perpendicular to a line scan direction of the image sensor, with respect to at least one region of the image; detecting a signal indicating a flicker, using the image signal; and generating an image in which a flicker is corrected, based on the signal indicating a flicker and the image.

17 Claims, 16 Drawing Sheets

METHOD AND APPARATUS FOR PROCESSING IMAGE OBTAINED BY CAMERA

CROSS-REFERENCE TO RELATED APPLICATION

This application is based on and claims priority under 35 U.S.C. § 119 to Korean Patent Application No. 10-2016-0036963, filed on Mar. 28, 2016, in the Korean Intellectual Property Office, the disclosure of which is incorporated by reference herein in its entirety.

BACKGROUND

1. Field

The present disclosure relates generally to an electronic device, a method of controlling the electronic device, and a computer-readable recording medium having stored thereon computer program code for executing the method of controlling the electronic device.

2. Description of Related Art

Electronic devices generate an imaging signal by exposing an imaging device to light during an exposure time. The imaging device may be exposed to light only during the exposure time via a shutter. The shutter used in the electronic devices may include a global shutter method and a rolling shutter method.

The global shutter method is a method, according to which the whole screen is reset at the same time and is started to be exposed to light. The global shutter method does not generate flickers, but requires an additional storage space in a sensor, thereby having low efficiency and causing increased expenses.

The rolling shutter method is a method, according to which light exposure is controlled in a line unit. The rolling shutter method does not require an additional storage space in a sensor. However, the rolling shutter method generates the jello effect, which is related to an occurrence of an up and down disparity of a screen.

Meanwhile, when electronic devices photograph a subject under illumination using an alternating current (AC) power source, a variation in brightness of the illumination occurs over time. Here, a frequency of the brightness of the illumination is proportionate to a frequency of the AC power source. For example, a frequency of an AC power source in Korea is a 1/60 second, and when a subject is photographed under illumination using this AC power source, a variation in brightness of the illumination occurs to generate a frequency of the brightness that is proportionate to the 1/60 second. In the case of a global shutter that exposes the whole screen to light, the variation in the brightness of the illumination is uniformly reflected on the whole screen. Accordingly, when the global shutter is used, a flicker phenomenon does not occur on the screen. On the contrary, when a rolling shutter is used, the variation in the brightness of the illumination is not uniformly reflected on the screen. For example, due to the variation in the brightness of the illumination, a captured image may have a stripe shape. This phenomenon, in which the brightness of a screen is not uniform based on the variation of the brightness of the illumination, is referred to as a flicker.

When the flicker phenomenon occurs, brightness varies depending on a region of a captured image, and thus, image quality of the captured image may be reduced.

SUMMARY

Methods of easily removing flickers in an image, using only one image obtained by an electronic device are provided.

Additional aspects will be set forth in part in the description which follows and, in part, will be apparent from the description.

According to an example aspect of an example embodiment of the present disclosure, a method of processing an image obtained by a camera includes: obtaining the image using an image sensor; identifying an image signal in a direction perpendicular to a line scan direction of the image sensor, with respect to at least one region of the image; detecting a signal indicating a flicker, using the image signal; and generating an image in which a flicker is corrected, based on the signal indicating a flicker and the image.

The identifying of the image signal may include dividing the at least one region of the image into a plurality of blocks, and identifying the signal indicating a flicker, by identifying an image signal of at least one of the plurality of blocks.

The dividing of the at least one region of the image may include dividing the image into a first number of blocks and a second number of blocks in a vertical direction and a horizontal direction, respectively, and the first number is set to be greater than the number of lines in which flickers occur.

The detecting of the signal may include determining a reference signal with respect to the at least one region by using a pre-set algorithm with respect to the image signal, and comparing the image signal with the reference signal.

The detecting of the signal may include calculating (determining) an average of the image signal as the reference signal; and detecting the signal indicating a flicker based on a ratio of the image signal to the reference signal.

The detecting of the signal may include detecting the signal indicating a flicker from the image signal, when the ratio of the image signal to the reference signal corresponds to a sine wave shape.

The generating of the image may include identifying a gain signal with respect to the signal indicating a flicker, and generating the image in which a flicker is corrected, by multiplying the image signal by the gain signal.

The generating of the image may include calculating (determining) the gain signal based on a ratio of the reference signal to the image signal.

The generating of the image may be performed along with correcting a lens shading phenomenon of the image.

According to an example aspect of another example embodiment of the present disclosure, an electronic device configured to process an image obtained by a camera includes: an image sensor configured to obtain the image; and a controller configured to identify an image signal in a direction perpendicular to a line scan direction of the image sensor with respect to at least one region of the image, to detect a signal indicating a flicker, using the image signal, and to generate an image in which a flicker is corrected, based on the signal indicating a flicker and the image.

The controller may be configured to divide the at least one region of the image into a plurality of blocks, and identify the signal indicating a flicker by identifying an image signal of at least one of the plurality of blocks.

The controller may be configured to divide the image into a first number of blocks and a second number of blocks in a vertical direction and a horizontal direction, respectively, and the first number may be set to be greater than the number of lines in which flickers occur.

The controller may be configured to determine a reference signal with respect to the at least one region by using a pre-set algorithm with respect to the image signal, and compare the image signal with the reference signal.

The controller may be configured to calculate (determine) an average of the image signal as the reference signal, and detect the signal indicating a flicker based on a ratio of the image signal to the reference signal.

The controller may be configured to detect the signal indicating a flicker from the image signal, when the ratio of the image signal to the reference signal corresponds to a sine wave shape.

The controller may be configured to identify a gain signal with respect to the signal indicating a flicker, and generate the image in which a flicker is corrected by multiplying the image signal by the gain signal.

The controller may be configured to calculate (determine) the gain signal based on a ratio of the reference signal to the image signal.

The controller may be configured to generate the image in which a flicker is corrected, while correcting a lens shading phenomenon of the image.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
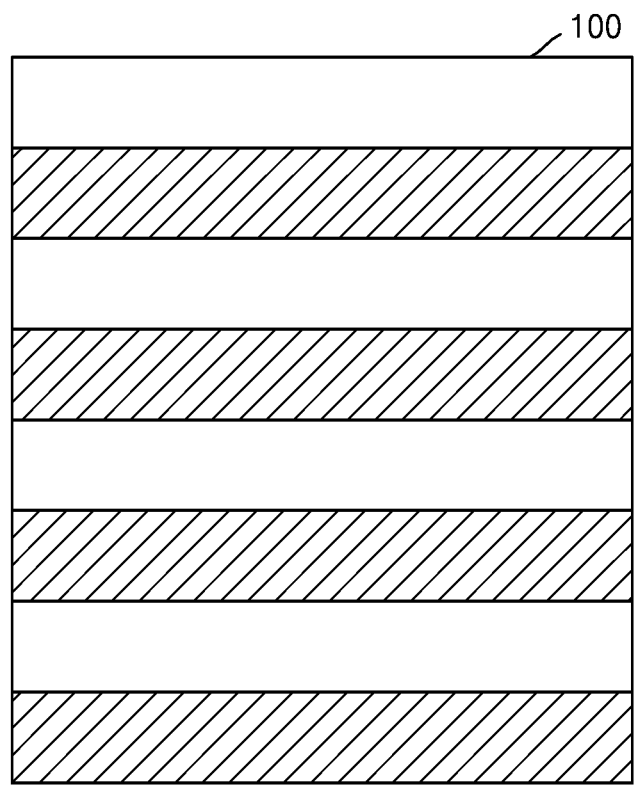
FIG. 1 is a diagram illustrating an example image in which flickers occur.

Hereinafter, various example embodiments of the present disclosure will be described by referring to the accompanying drawings. However, this is not intended to limit the disclosure to particular modes of practice, and it is to be appreciated that all changes, equivalents, and substitutes that do not depart from the spirit and technical scope are encompassed in the disclosure. In the description, like reference numerals refer to the like elements.

In the present disclosure, it is to be understood that the terms such as "including," "having," and "comprising" are intended to indicate the existence of the features, numbers, steps, actions, components, parts, or combinations thereof disclosed in the disclosure, and are not intended to preclude the possibility that one or more other features, numbers, steps, actions, components, parts, or combinations thereof may exist or may be added.

In the present disclosure, the expressions "A or B," "at least one of A and B," and "one or more than one of A and B" may include every possible combination of listed items. For example, "A or B," "at least one of A and B," and "at least one of A or B," may refer to all cases including (1) at least one A, (2) at least one B, and (3) at least one A and at least one B.

The expression used in this disclosure, "configured to," may be interchangeable with, for example, "suitable for," "having the capacity to," "designed to," "adapted to," "made to," or "capable of." The expression "configured to" does not necessarily refer to only "specifically designed to." Rather, the expression "a device configured to" may denote that the device "is capable of" something with other devices or components. For example, the expression "a processor configured to perform A, B, and C" may denote an exclusive processor (for example, an embedded processor) for performing the operations, or a general purpose processor (for example, a central processing unit (CPU) or an application processor) that is capable of performing the operations by executing one or more software programs stored in a memory device.

The terms used in the present disclosure are merely used to describe particular embodiments, and are not intended to limit the disclosure. An expression used in the singular encompasses the expression of the plural, unless it has a clearly different meaning in the context. All terms including technical and scientific terms used herein have meanings which can be generally understood by those of ordinary skill in the art, if the terms are not particularly defined. General terms defined by dictionaries should be understood to have meanings which can be contextually understood in the art and should not have ideally or excessively formal meanings, if the terms are not defined particularly herein by the present disclosure.

Electronic devices according to various embodiments of the present disclosure may include, for example, at least one of smartphones, tablet personal computers (PCs), mobile phones, video telephones, electronic-book readers, desktop PCs, laptop PCs, netbook computers, workstations, servers, personal digital assistants (PDAs), portable multimedia players (PMPs), MP3 players, mobile medical devices, cameras, and wearable devices, or the like, but are not limited thereto. According to various embodiments, the wearable device may include, for example, at least one of an accessory type (for example, a watch, a ring, a bracelet, an ankle bracelet, a necklace, glasses, contact lenses, or a head-mounted-device (HMD)), a fabric or clothing integral type (for example, electronic clothing), a body-coupled type (for example, a skin pad or tattoos), and a bio-transplant type (for example, an implantable circuit), or the like, but is not limited thereto.

In some embodiments, an electronic device may be a home appliance. The home appliance may include, for example, at least one of a television, a digital video disk (DVD) player, an audio system, a refrigerator, an air-conditioner, a vacuum cleaner, an oven, a microwave, a laundry machine, an air cleaner, a set-top box, a home automation control panel, a security control panel, a TV box (for example, Samsung HomeSync™, Apple TV™, or Google TV™), a game console (for example, Xbox™ PlayStation™), an electronic dictionary, an electronic key, a camcorder, and an electronic frame, or the like, but is not limited thereto.

Hereinafter, electronic devices according to embodiments will be described by referring to the accompanying drawings. In this disclosure, the term "user" may refer, for example, to a person that uses an electronic device or a device that uses the electronic device (for example, an artificial intelligence (AI) electronic device).

FIG. 1 is a diagram illustrating an example image in which flickers occur.

According to an embodiment, when an electronic device uses a rolling shutter method, a flicker may occur in an image 100 obtained by the electronic device. When a flicker occurs in an image, a stripe shape is generated in the image 100 due to a variation in brightness of illumination, as illustrated in FIG. 1.

Figure 2:
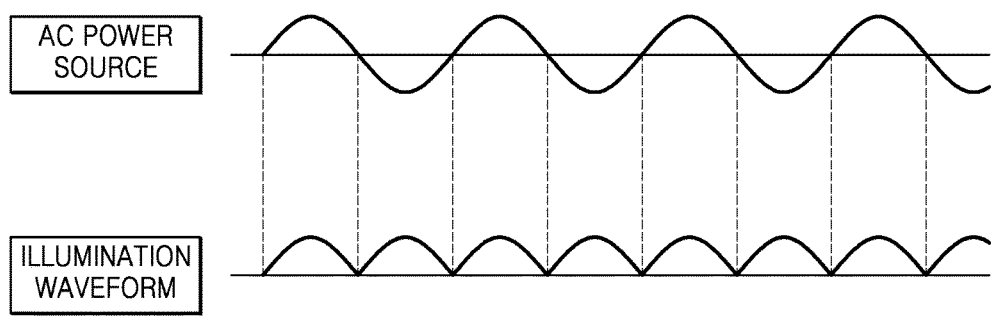
FIGS. 2 and 3 are diagrams illustrating an example principle in which flickers occur.
Figure 3:
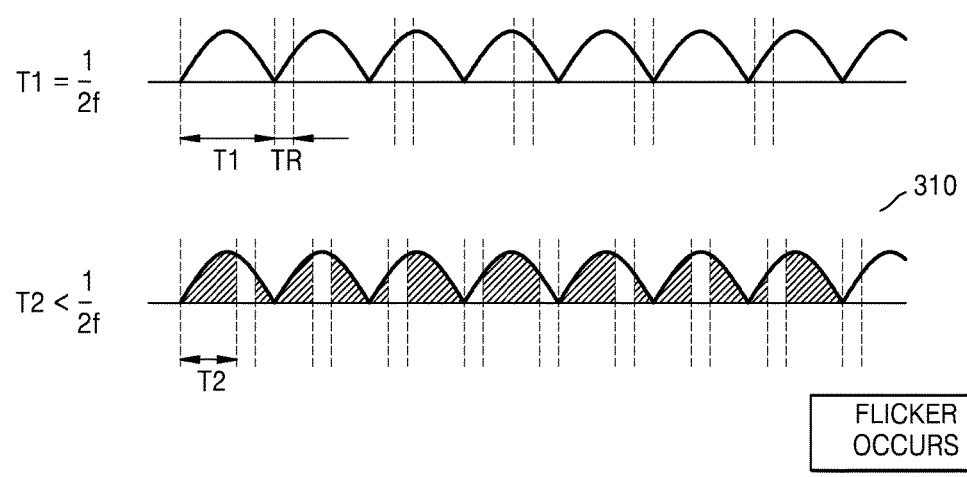

FIGS. 2 and 3 are diagrams illustrating a principle in which flickers occur.

As illustrated in FIG. 2, an alternating current (AC) power source may have a waveform of a sine wave having a pre-determined frequency. For example, an AC power source in Korea may have a frequency of about 60 Hz, and an AC power source in Japan may have a frequency of about 50 Hz.

The illumination operating using such AC power source has a frequency that is twice the frequency of the AC power source. An illumination device uses the AC power source by rectifying the AC power source, and when the illumination device performs full wave rectification on the AC power source, an illumination waveform as illustrated in FIG. 2 is generated, and this waveform is reflected in light that is output from the illumination device, as a variation in brightness, so that a flicker may occur.

Under this illumination, when an exposure time is set as N/2f (here, N is a natural number and f is a frequency of the AC power source), a flicker may not occur in an image. As illustrated in FIG. 3, when an exposure time T1 is set as ½f, each of the lines of an imaging device is exposed to light for a cycle of an illumination flicker so that an integral value of light intensity of the illumination becomes equal at each line, and thus, a flicker may not occur. As illustrated in FIG. 3, even if a read out section (TR) intervenes between light exposure sections of the lines, the light exposure time of each line becomes always ½f, and thus, a flicker may not occur.

However, when an exposure time T2 is not set as N/2f as shown in the following Equation, a flicker may occur in an image.

$$T2 \neq N/2f \quad \text{[Equation]}$$

For example, as illustrated in 310 of FIG. 3, when the exposure time T2 is set as a time that is shorter than ½f, an integral value of light that is output from the illumination while each line is exposed to light becomes different at each line, and thus, a flicker may occur in an image. This phenomenon frequently occurs especially in an electronic shutter using the rolling shutter method.

Figure 4:
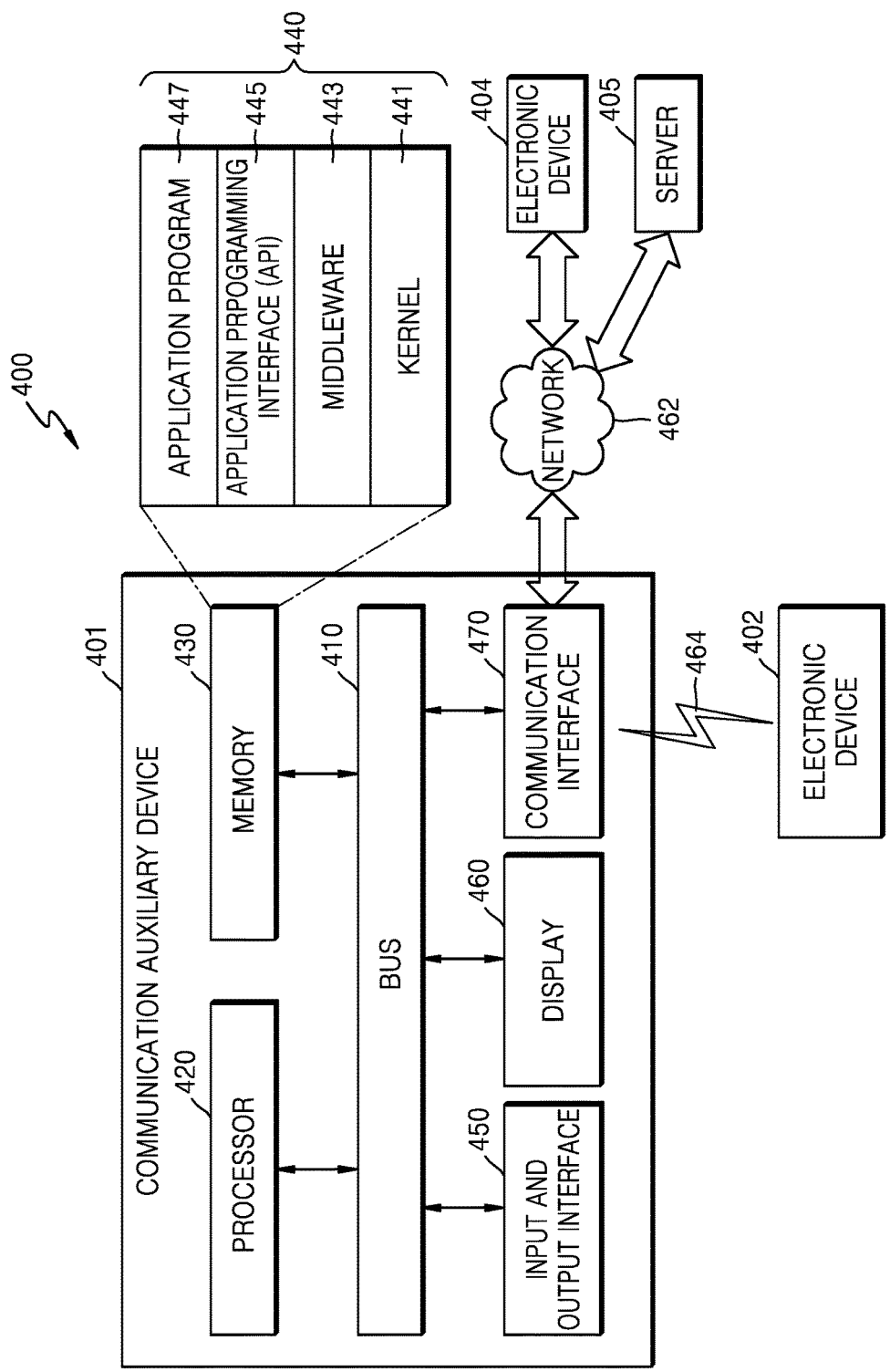
FIG. 4 is a block diagram illustrating an example electronic device in a network environment, according to various example embodiments.

FIG. 4 is a block diagram illustrating an example electronic device 401 in a network environment 400, according to various example embodiments.

The electronic device 401 may include a bus 410, a processor (e.g., including processing circuitry) 420, a memory 430, an input and output interface (e.g., including input/output circuitry) 450, a display 460, and a communication interface (e.g., including communication circuitry) 470. In some embodiments, the electronic device 401 may omit at least one of the described components or may further include other components.

The bus 410 may include a circuit configured to connect the components described above and transmit communication (for example, a control message and/or data) among the components.

The processor 420 may include various processing circuitry, such as, for example, and without limitation, one or more of a dedicated processor, a central processing unit (CPU), an application processor (AP), and a communication processor (CP). The processor 420 may perform calculations or data processing for control of and/or communication with at least one other component of the electronic device 401.

The memory 430 may include a volatile and/or a non-volatile memory. For example, the memory 430 may store a command or data related to at least one other component of the electronic device 401. According to an embodiment, the memory 430 may store software and/or a program 440.

The program 440 may include, for example, a kernel 441, middleware 443, an application programming interface (API) 445, and/or an application program (or an application) 447. At least one of the kernel 441, the middleware 443, and the API 445 may be referred to as an operating system (OS).

The input and output interface 450 may function as an interface that transmits a command or data that is input from a user or an external device to (an)other component(s) of the electronic device 401. Also, the input and output interface 450 may output a command or data received from (an)other component(s) of the electronic device 401 to another external device.

The display 460 may include, for example, a liquid crystal display (LCD), a light-emitting diode (LED) display, an organic light-emitting diode (OLED) display, a micro-electromechanical systems (MEMS) display, or an electronic paper display, or the like, but is not limited thereto. The communication interface 470 may set communication between, for example, the electronic device 401 and an external device (for example, a first external electronic device 402, a second external electronic device 404, or a server 405), and may do so via network communication 462, short-range communication 464, or the like.

Each of the first and second external electronic devices 402 and 404 may be the same type of device as the electronic device 401 or a different type of device from the electronic device 401.

Figure 5:
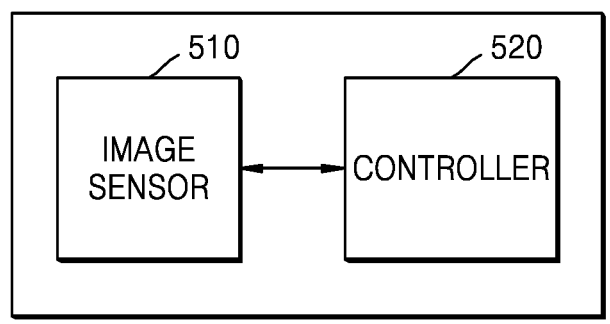
FIG. 5 is a block diagram illustrating an example electronic device according to an example embodiment.

FIG. 5 is a block diagram illustrating an example electronic device 500 according to an example embodiment.

The electronic device 500 according to the present example embodiment may include an image sensor 510 and a controller (e.g., including processing circuitry) 520. However, this is merely an example embodiment, and the electronic device 500 may further include at least one other component, according to another embodiment.

The image sensor 510 according to an embodiment may obtain an image. For example, the image sensor 510 may obtain the image based on an input of a user. As another example, the image sensor 510 may automatically obtain an image at a pre-determined time.

The controller 520 according to an embodiment may include various processing and/or controller circuitry and identify an image signal in a direction that is perpendicular to a line scan direction of the image sensor 510, with respect to at least a region of the image. Also, the controller 520 may detect a signal indicating a flicker by using the image signal, and generate an image in which a flicker is corrected, based on the signal indicating a flicker and the image.

The controller 520 according to an embodiment may divide the at least one region of the image into a plurality of blocks, and identify an image signal of at least one of the plurality of blocks to identify the signal indicating a flicker.

The controller 520 according to an embodiment may divide the image into a first number of blocks and a second number of blocks in a vertical direction and a horizontal direction, respectively. Here, the first number may be set to be greater than the number of lines in which flickers occur.

The controller 520 according to an embodiment may determine a reference signal with respect to the at least one region using an algorithm that is pre-set with respect to the image signal. Also, the controller 520 may compare the image signal with the reference signal. The controller 520 according to an embodiment may determine an average of the image signal as the reference signal. The controller 520 may detect the signal indicating a flicker based on a ratio of the image signal to the reference signal. The controller 520 may detect the signal indicating a flicker from the image signal, when the ratio of the image signal to the reference signal corresponds to a sine wave shape.

The controller 520 according to an embodiment may identify a gain signal with respect to the signal indicating a flicker. The controller 520 may generate an image in which a flicker is corrected by multiplying the image signal by the gain signal. The controller 520 may determine the gain signal based on a ratio of the reference signal to the image signal.

The controller 520 according to an embodiment may generate the image in which a flicker is corrected, while performing an operation of correcting lens shading of the image.

Figure 6:
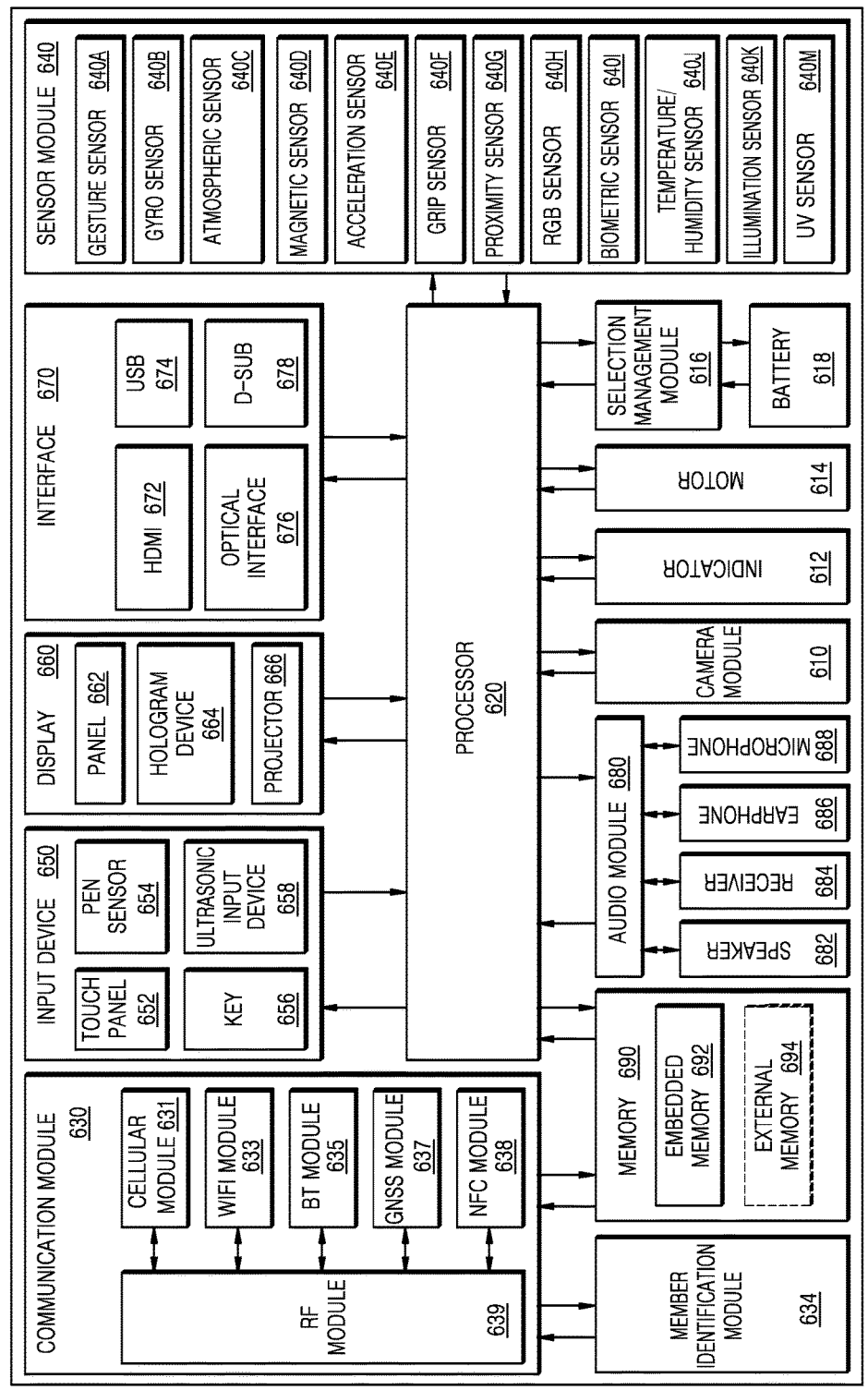
FIG. 6 is a block diagram illustrating an example electronic device according to another example embodiment.

FIG. 6 is a block diagram illustrating an example electronic device 600 according to another example embodiment.

The electronic device 600 according to the present example embodiment may include a camera module 610, an indicator 612, a motor 614, a power management module 616, a battery 618, a processor (e.g., including processing circuitry) 620, a communication module (e.g., including communication circuitry) 630, a member or subscriber identification module 634, a sensor module 640, an input device (e.g., including input circuitry) 650, a display 660, an interface (e.g., including interface circuitry) 670, an audio module 680, and a memory 690.

The camera module 610 may obtain an image. For example, the camera module 610 is a device that is configured to capture a static image and a video. According to an embodiment, the camera module 610 may include at least one image sensor (for example, a front sensor or a rear sensor), a lens, an image signal processor (ISP), or a flash (for example, an LED, a xenon lamp, or the like).

The indicator 612 may indicate a specific state of the electronic device 600 or components (for example, the processor 620) thereof. For example, the indicator 612 may indicate a booting state, a message state or a charge state of the electronic device 600 or the components thereof.

The motor 614 may convert an electrical signal into mechanical vibration, and generate vibration or a haptic effect.

The power management module 616 may, for example, manage power of the electronic device 600. According to an embodiment, the power management module 616 may include a power management integrated circuit (PMIC), a charger integrated circuit (IC), or a battery or a fuel gauge. The PMIC may have a wired and/or a wireless charge method. The battery gauge may measure, for example, a remainder of the battery 618, or a voltage, current, temperature of the battery 618 during a charge operation.

The processor 620 may include various processing circuitry and drive, for example, an OS or an application program to control a plurality of hardware or software components connected to the processor 620 and to perform various data processing operations and calculations. The processor 620 may be embodied, for example, as a system on chip (SoC). According to an embodiment, the processor 620 may further include a graphics processing unit (GPU) and/or an image signal processor. The processor 620 may include at least one (for example, a cellular module 631) of components illustrated in FIG. 6. The processor 620 may load a command or data received from at least one of other components (for example, a nonvolatile memory) to a volatile memory and process the command or data, and may store various pieces of data to the nonvolatile memory.

The processor 620 according to an embodiment may divide an image obtained by the camera module 610 into blocks having a pre-determined size. For example, the processor 620 may divide the image into a first number of blocks and a second number of blocks in a vertical direction and a horizontal direction, respectively. Here, the first number may be set to be greater than the number of lines in which flickers occur.

The processor 620 according to an embodiment may determine a block value, which is an average value of pixels included in the divided blocks, wherein each of the divided blocks includes at least one of the pixels. Also, the processor 620 may group the blocks according to a section which is pre-determined in a vertical direction, and determine a section average value, which is an average value of the blocks included in the grouped section. For example, the processor 620 may move the blocks in the vertical direction, and determine the blocks included in the pre-determined section, based on a block which is sequentially selected.

The processor 620 according to an embodiment may determine whether a flicker occurs in the obtained image, by comparing the determined block value with the determined section average value. For example, the processor 620 may determine that a flicker occurs in the image, when a ratio between the block value and the section average value corresponds to a sine wave shape. Also, the processor 620 may compare the block value with the section average value in a row unit of the divided blocks.

When a flicker occurs in the image, the processor 620 according to an embodiment may remove the flicker in the image, using a ratio of the section average value to the block value. For example, the processor 620 may remove the flicker in the image by performing an operation of multiplying the block value by a gain value which is determined based on the ratio of the section average value to the block value. Here, the gain value, by which the block value is multiplied, may be the same for each row unit of the blocks included in the image.

The processor 620 according to an embodiment may remove the flicker in the image, while performing correction of a lens shading phenomenon of the terminal.

The communication module 630 may include various communication circuitry, such as, for example, and without limitation, a cellular module 631, a WiFi module 633, a Bluetooth module 635, a GNSS module 637 (for example, a GPS module, a Glonass module, a Beidou module, or a Galileo module), a near-field communication (NFC) module 638, and a radio frequency (RF) module 639.

The sensor module 640 may, for example, measure a physical quantity or sense an operating state of the electronic device 600 and convert the measured or sensed information into an electrical signal. The sensor module 640 may include, for example, at least one of a gesture sensor 640A, a gyro sensor 640B, an atmospheric sensor 640C, a magnetic sensor 640D, an acceleration sensor 640E, a grip sensor 640F, a proximity sensor 640G, a color sensor 640H (for example, an RGB (red, green, blue) sensor), a biometric sensor 640I, a temperature/humidity sensor 640J, an illuminance (e.g., illumination) sensor 640K, and an ultra violet (UV) sensor 640M. The sensor module 640 may further include a control circuit for controlling the at least one sensor included in the sensor module 640. In some embodiments, the electronic device 600 may further include a processor configured to control the sensor module 640, as part of the processor 620, or separately from the processor 620, so that the processor may control the sensor module 640 while the processor 620 is in a sleep state.

The input device 650 may include various input circuitry, such as, for example, and without limitation, a touch panel 652, a (digital) pen sensor 654, a key 656, or an ultrasonic input device 658. The touch panel 652 may use, for example, at least one of an electrostatic method, a resistive method, an infrared method, and an ultrasonic method. Also, the touch panel 652 may further include a control circuit. The touch panel 652 may further include a tactile layer to provide a haptic effect to a user.

The (digital) pen sensor 654 may include, for example, a recognition sheet, which is part of a touch panel or is separate from the touch panel. The key 656 may include, for example, a physical button, an optical key, or a keypad. The ultrasonic input device 658 may sense ultrasonic waves generated by an input device, via a microphone (for example, a microphone 688), and identify data corresponding to the sensed ultrasonic waves.

The display 660 may include a panel 662, a hologram device 664, or a projector 666. The panel 662 may be realized, for example, as flexible, transparent, or wearable. The panel 662 may be integrally formed with the touch panel 652.

The interface 670 may include various interface circuitry, such as, for example, and without limitation, a high-definition multimedia interface (HDMI) 672, a universal serial bus (USB) 674, an optical interface 676, or a D-subminiature (D-sub) 678.

The audio module 680 may, for example, bi-directionally convert a sound and an electrical signal. The audio module 680 may, for example, process sound information that is input or output via a speaker 682, a receiver 684, earphones 686, or the microphone 688.

The memory 690 may include, for example, an embedded memory 692 and/or an external memory 694. The embedded memory 692 may include, for example, at least one of a volatile memory (for example, dynamic random access memory (DRAM), static random access memory (SRAM), or synchronous dynamic random access memory (SDRAM)), a nonvolatile memory (for example, one time programmable read only memory (OTPROM), programmable read only memory (PROM), erasable and programmable read only memory (EPROM), electrically erasable and programmable read only memory (EEPROM), mask read only memory, flash read only memory, or flash memory (for example, NAND flash or NOR flash)), a hard drive, and a solid state drive (SSD).

The external memory 694 may further include a flash drive. For example, the external memory 694 may further include compact flash (CF), secure digital (SD), micro secure digital (Micro-SD), mini secure digital (Mini-SD), extreme digital (xD), a multimedia card (MMC), or a memory stick. The external memory 694 may be functionally and/or physically connected to the electronic device 600 via various interfaces.

The image sensor 510 of FIG. 5 may correspond to the camera module 610 of FIG. 6. The controller 520 of FIG. 5 may correspond to the processor 620 of FIG. 6.

Figure 7:
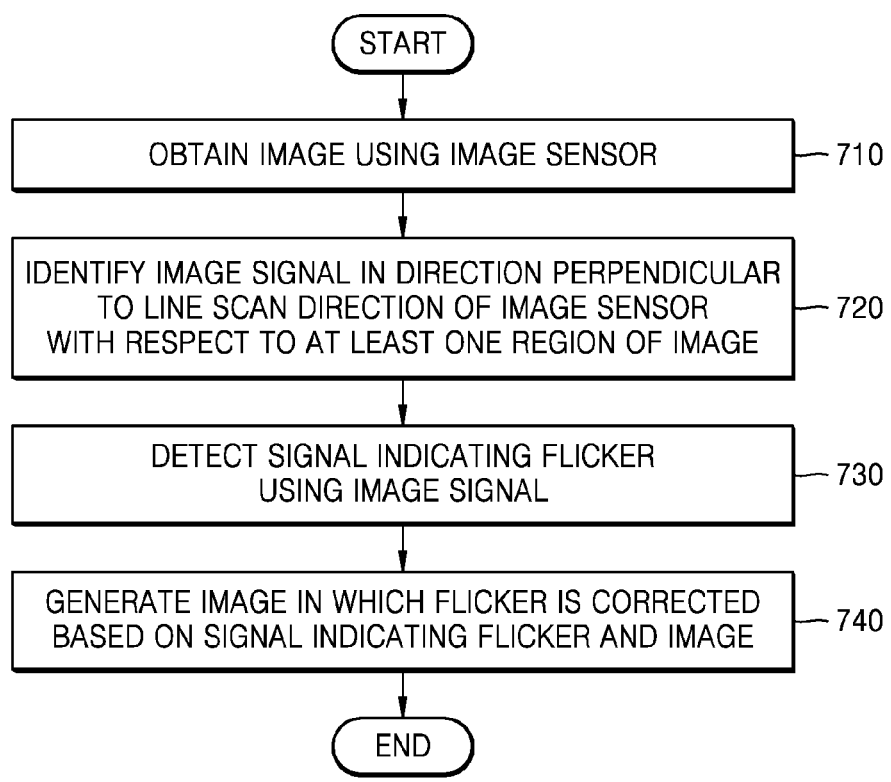
FIG. 7 is a flowchart illustrating an example method of processing an image obtained by a camera, via an electronic device, according to an example embodiment.

FIG. 7 is a flowchart illustrating an example method of processing an image obtained by a camera, via the electronic device 600, according to an example embodiment.

In operation 710, the electronic device 600 (for example, the camera module 610) may obtain an image using an image sensor (not shown).

The electronic device 600 (for example, the camera module 610) according to an embodiment may obtain the image, based on an input of a user. As another example, the electronic device 600 (for example, the camera module 610) may automatically obtain the image at a pre-determined time.

In operation 720, the electronic device 600 (for example, the controller 620) may identify an image signal in a direction perpendicular to a line scan direction of the image sensor with respect to at least one region of the image.

The electronic device 600 (for example, the controller 620) according to an embodiment may divide the at least one region of the image into a plurality of blocks. For example, the electronic device 600 (for example, the controller 620) may divide the obtained image into N vertical images and M horizontal images to generate N×M blocks. Here, each of the generated N×M blocks may include at least one of a plurality of pixels included in the image. Here, N may be set to be greater than the number of lines in which flickers occur.

The electronic device 600 (for example, the controller 620) according to an embodiment may determine a block value of each of the generated blocks. The block value may be an average value of the pixels included in the blocks, wherein each of the blocks includes at least one of the pixels. Hereinafter, an average value of values of the pixels will be referred to as an average value of the pixels. The electronic device 600 (for example, the controller 620) may determine the number of blocks that are divided, according to the number of flicker lines, which is determined based on a read out speed of the image sensor and a frequency of ambient light. The number of flicker lines may be determined as 2*a/b, when the read out speed of the image sensor is bfps in an environment in which light of a Hz exists. For example, when the read out speed of the image sensor is 22 fps in an environment in which fluorescent light of 60 Hz exists, the electronic device 600 (for example, the controller 620) may determine the number of flicker lines as 5.4545, which equals 2*60 Hz/22 fps. When the electronic device 600 (for example, the controller 620) divides the image into N blocks and M blocks in a vertical direction and a horizontal direction, respectively, N may be determined as a value that is greater than the number of flicker lines. For example, when the number of flicker lines is 5.4545, the electronic device 600 may determine N as a value that is equal to or greater than 5.4545.

In operation 730, the electronic device 600 (for example, the controller 620) may detect a signal indicating a flicker, using an image signal.

The electronic device 600 (for example, the controller 620) according to an embodiment may identify the signal indicating a flicker, by identifying an image signal of at least one of the plurality of blocks. The electronic device 600 (for example, the controller 620) may determine a reference signal with respect to the at least one region using an algorithm that is pre-set with respect to the image signal. For example, the electronic device 600 (for example, the controller 620) may determine an average of the image signal as the reference signal.

Also, the electronic device 600 (for example, the controller 620) may detect the signal indicating a flicker in the image, by comparing the image signal with the reference signal. In detail, the electronic device 600 (for example, the controller 620) may detect the signal indicating a flicker from the image signal, based on a ratio of the image signal to the reference signal. For example, when the ratio of the image signal to the reference signal corresponds to a sine wave shape, the electronic device 600 (for example, the controller 620) may detect the signal indicating a flicker from the image signal.

In operation 740, the electronic device 600 (for example, the controller 620) may generate an image in which a flicker is corrected, based on the signal indicating a flicker and the image.

The electronic device 600 (for example, the controller 620) according to an embodiment may identify a gain signal with respect to the signal indicating a flicker. Here, the gain signal may be determined based on a ratio of the reference signal to the image signal.

Also, the electronic device 600 (for example, the controller 620) may generate the image in which a flicker is corrected by multiplying the image signal by the gain signal.

When a flicker occurs in the image, the electronic device 600 according to an embodiment may remove the flicker in the image by performing an operation of multiplying a block value by a gain value which is determined based on a ratio of a section average value to the block value. Here, the gain value, by which the block value is multiplied, may be the same for each row unit of the blocks included in the image.

Meanwhile, the controller 620 according to an embodiment may remove the flicker in the image while performing at the same time a process of correcting a lens shading phenomenon of the electronic device 600.

Figure 8:
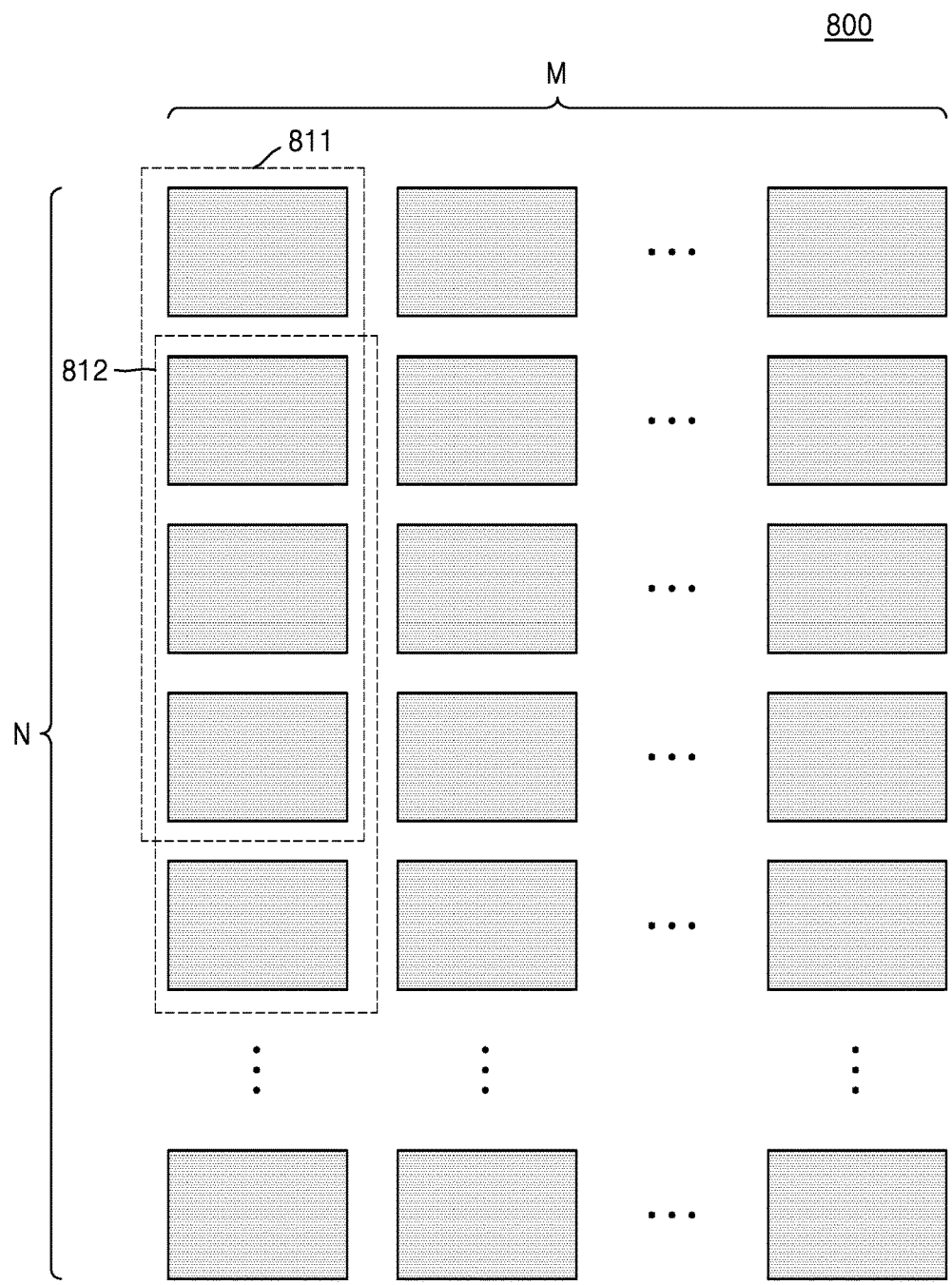
FIG. 8 is a diagram illustrating an example method of determining a section average value with respect to a plurality of blocks included in an image, via an electronic device, according to an example embodiment.

FIG. 8 is a diagram illustrating an example method of determining a section average value with respect to the plurality of blocks included in the image, via the electronic device 600, according to an example embodiment.

Referring to FIG. 8, the electronic device 600 may divide the image 800 into N×M blocks. For example, the electronic device 600 may divide the image into M images and N images in a horizontal direction and a vertical direction, respectively, to generate N×M blocks. Also, the electronic device 600 may determine a block value, which is an average value of pixels included in the N×M blocks, wherein each of the N×M blocks includes at least one of the pixels. Here, with respect to coordinates of the blocks included in the image, a block located at an upper left end may be indicated as (1,1), a block located at a lower left end may be indicated as (N, 1), and a block located at an upper right end may be indicated as (1, M).

When there are four pre-determined sections, the electronic device 600 may determine a section average value of a first section 811, using block values of the blocks (1, 1), (2, 1), (3, 1), and (4, 1) included in the first section 811. Next, the electronic device 600 may determine a section average value of a second section 812, using block values of blocks (2, 1), (3, 1), (4, 1), and (5, 1) included in the second section 812. Based on this method, the electronic device 600 may determine N×M section average values with respect to the image including the N×M blocks.

Figure 9:
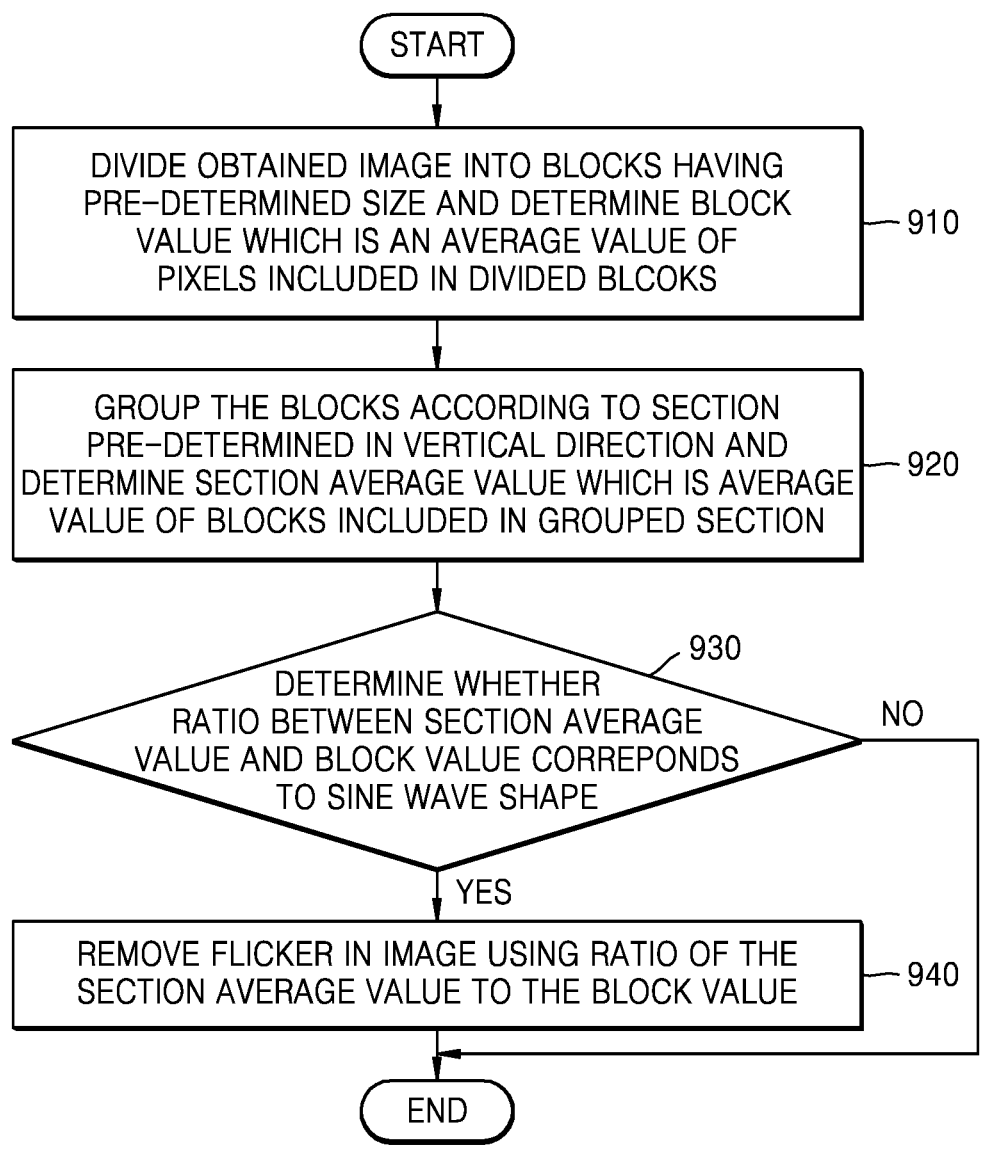
FIG. 9 is a flowchart illustrating an example method of detecting a signal indicating a flicker from an image signal, via an electronic device, according to an example embodiment.

FIG. 9 is a flowchart illustrating an example method of detecting a signal indicating a flicker from an image signal, via the electronic device 600, according to an example embodiment.

In operation 910, the electronic device 600 (for example, the controller 620) may divide an obtained image into blocks having a pre-determined size, and determine a block value, which is an average value of pixels included in the divided blocks, wherein each of the divided blocks includes at least one of the pixels.

The electronic device 600 (for example, the controller 620) according to an embodiment may divide the obtained image into the blocks having a pre-determined size. For example, the electronic device 600 (for example, the controller 620) may divide the obtained image into N images and M images in a vertical direction and a horizontal direction, respectively, to generate N×M blocks. Here, each of the generated N×M blocks may include at least one of the plurality of pixels included in the image.

Also, the electronic device 600 (for example, the controller 620) may determine a block value of each of the generated blocks. The block value may be an average value of values of the pixels included in the blocks, wherein each of the blocks includes at least one of the pixels. Hereinafter, the average value of the values of the pixels will be referred to as the average value of the pixels.

The electronic device 600 (for example, the controller 620) may determine the number of blocks that are divided, according to the number of flicker lines, which is determined based on a read out speed of the image sensor and a frequency of ambient light. The number of flicker lines may be determined as 2*a/b, when the read out speed of the image sensor is bfps in an environment in which light of aHz exists. For example, when the read out speed of the image sensor is 22 fps in an environment in which fluorescent light of 60 Hz exists, the electronic device 600 (for example, the controller 620) may determine the number of flicker lines as 5.4545, which equals 2*60 Hz/22 fps. When the electronic device 600 (for example, the controller 620) divides the image into N blocks and M blocks in a vertical direction and a horizontal direction, respectively, N may be determined as a value that is greater than the number of flicker lines. For example, when the number of flicker lines is 5.4545, the electronic device 600 may determine N as a value that is equal to or greater than 5.4545.

In operation 920, the electronic device 600 (for example, the controller 620) may group the blocks according to a section pre-determined in the vertical direction, and determine a section average value, which is an average value of the blocks included in the grouped section.

Accordingly, a section may include at least one block. The electronic device 600 (for example, the controller 620) according to an embodiment may group the blocks included in the image according to a section T, which is pre-determined in the vertical direction. For example, when a coordinate of the block located at the upper left end is indicated as (1, 1), the electronic device 600 (for example, the controller 620) may group the blocks by including the block of (1, 1) through the block (T, 1) included in the section T in the vertical direction. The electronic device 600 (for example, the controller 620) may determine the section average value, which is the average value of the block values of the grouped blocks. Hereinafter, the average value of the block values of the grouped blocks will be referred to as the average value of the grouped blocks.

Also, the electronic device 600 (for example, the controller 620) may determine the section average value by sequentially grouping the blocks included in the image For example, after the average value of the blocks from (1, 1) to (T, 1) is determined, the electronic device 600 may calculate the average value of the blocks from (2, 1) to (T+1, 1). Accordingly, the electronic device 600 (for example, the controller 620) may calculate N×M section average values with respect to the image including the N×M blocks.

Meanwhile, the electronic device 600 (for example, the controller 620) may determine the section based on a value that is obtained by dividing the number of flicker lines by the number of blocks divided in the vertical direction. For example, when the number of flicker lines is 5.4545, and the number of blocks divided in the vertical direction is 65, the section may be determined as 12, which is approximate to 11. 91, which is a result of dividing 65 by 5.4545.

In operation 930, the electronic device 600 (for example, the controller 620) may determine whether a ratio between the section average value and the block value corresponds to a sine wave shape.

The electronic device 600 (for example, the controller 620) according to an embodiment may determine the ratio between the block value of each of the blocks included in the image and the section average value of the image. The electronic device 600 may determine that a flicker occurs in the image, when the ratio between the block value and the section average value corresponds to a sine wave shape.

In operation 940, the electronic device 600 (for example, the controller 620) may remove the flicker in the image using a ratio of the section average value to the block value.

When it is determined that a flicker occurs in the image, the electronic device 600 (for example, the controller 620) according to an embodiment may determine a gain value determined based on the ratio of the section average value to the block value, in order to remove the flicker. The electronic device 600 (for example, the controller 620) may remove the flicker included in the image, by performing an operation of multiplying each of the blocks included in the image by the calculated gain value. Here, the gain value, by which each of the blocks is multiplied, may be the same for each row unit of the blocks included in the image.

Figure 10:
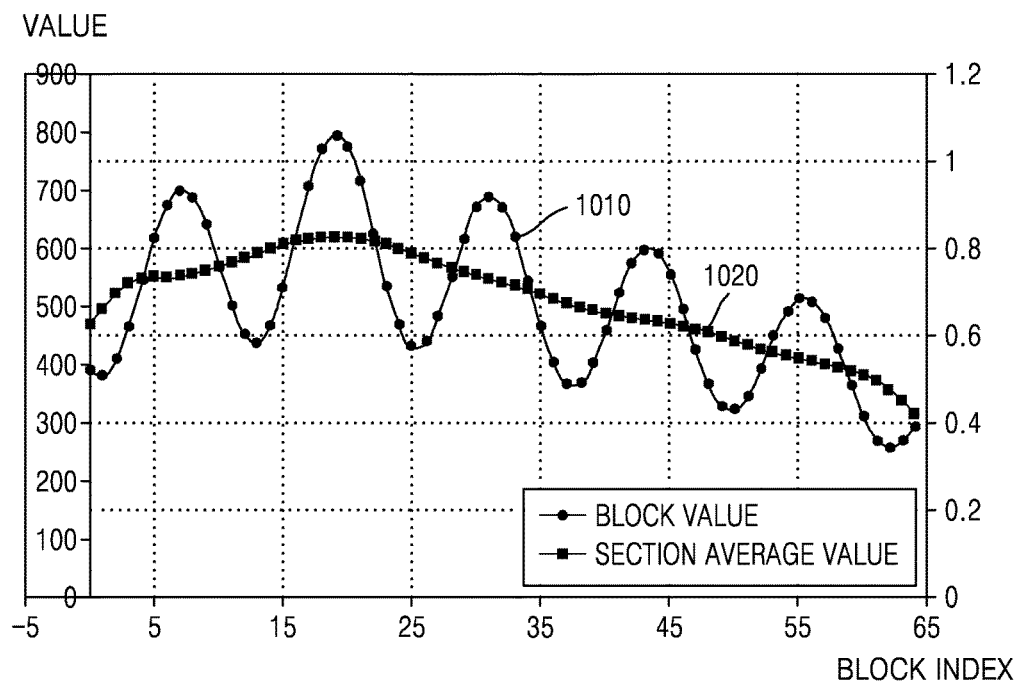
FIG. 10 is a graph illustrating a block value and a section average value which are determined in an image in which flickers occur, by an electronic device, according to an example embodiment.

FIG. 10 is a graph illustrating a block value 1010 and a section average value 1020, determined in an image in which a flicker occurs, via the electronic device 600 (for example, the controller 620), according to an example embodiment.

The electronic device 600 (for example, the controller 620) according to an embodiment may determine each of the block value 1010 and the section average value 1020 of the obtained image.

For example, when the image is divided into N×M blocks, the electronic device 600 (for example, the controller 620) may determine the average value of pixels included in the blocks, wherein each of the blocks includes at least one of the pixels, as the block value 1010. Also, the electronic device 600 (for example, the controller 620) may group the blocks according to a section that is pre-determined in a row unit, and determine the section average value 1020, which is an average value of the blocks included in the grouped section.

Also, the electronic device 600 may determine a ratio between the block value 1010 and the section average value 1020 and determine whether the determined ratio corresponds to a sine wave shape, in order to identify whether there is a signal indicating a flicker in the obtained image.

Figure 11:
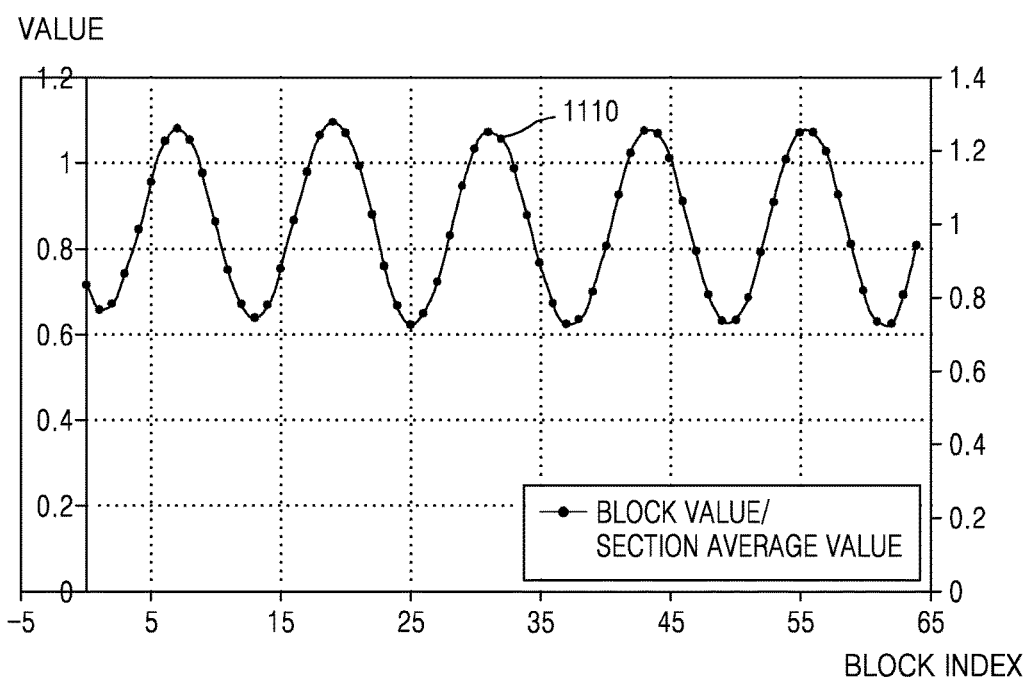
FIG. 11 is a graph illustrating a ratio of a block value to a section average value determined by an electronic device in an image in which flickers occur, according to an example embodiment.

FIG. 11 is a graph illustrating a ratio 1110 of a block value to a section average value determined via the electronic device 600 (for example, the controller 620) in an image in which a flicker occurs, according to an example embodiment.

In order to identify whether a flicker occurs in the obtained image, the electronic device 600 (for example, the controller 620) according to an embodiment may determine the ratio 1110 of the block value to the section average value. Referring to FIG. 11, it is seen that the ratio 1110 of the block value to the section average value is indicated as a signal having a sine wave shape. Accordingly, the electronic device 600 (for example, the controller 620) may determine that a flicker occurs in the obtained image. The embodiment illustrated in FIG. 11 is the case in which the number of flicker lines is 5.45, and it is seen via the number of sine wave shapes in the graph that 5.45 flicker lines occur.

Figure 12:
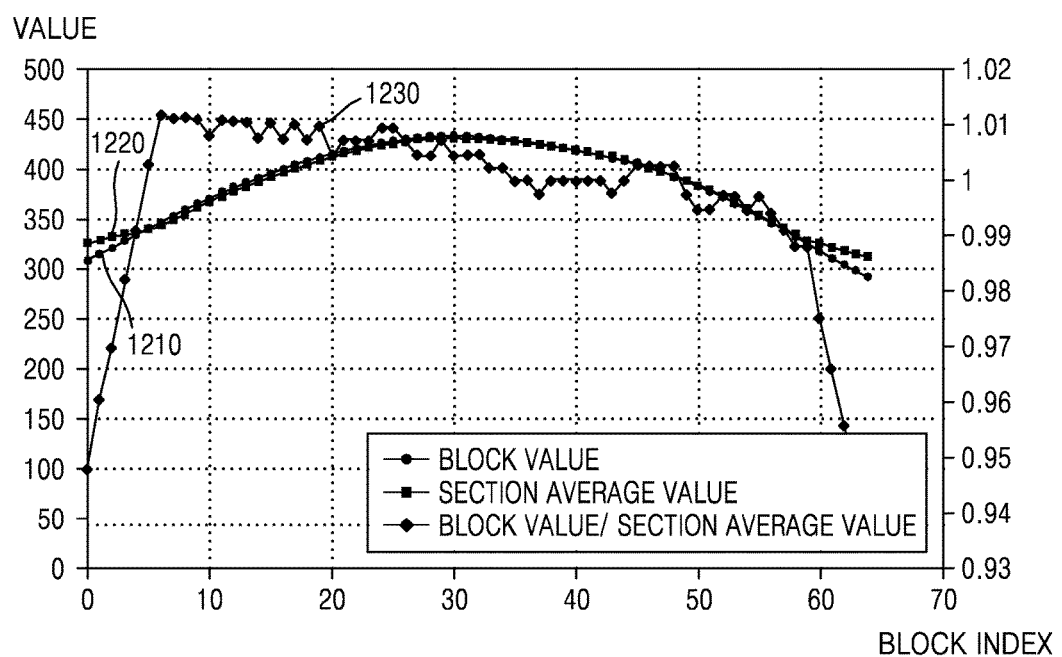
FIG. 12 is a graph illustrating a block value, a section average value, and a ratio of the block value to the section average value, determined by an electronic device in an image in which flickers do not occur, according to an example embodiment.

FIG. 12 is a graph illustrating a block value 1210, a section average value 1220, and a ratio 1230 of the block value 1210 to the section average value 1220, determined via the electronic device 600 (for example, the controller 620) in an image in which a flicker does not occur, according to an example embodiment.

Referring to the graph of FIG. 12, it is seen that a signal indicating the ratio 1230 of the block value 1210 to the section average value 1220 determined by the electronic device 600 (for example, the controller 620) with respect to the obtained image does not correspond to a sine wave shape. As it is determined that the ratio 1230 of the block value 1210 to the section average value 1220 does not correspond to the sine wave shape, the electronic device 600 (for example, the controller 620) may determine that a flicker does not occur in the image. Accordingly, the electronic device 600 (for example, the controller 620) may not additionally perform a process of removing the flicker in the obtained image.

Figure 13:
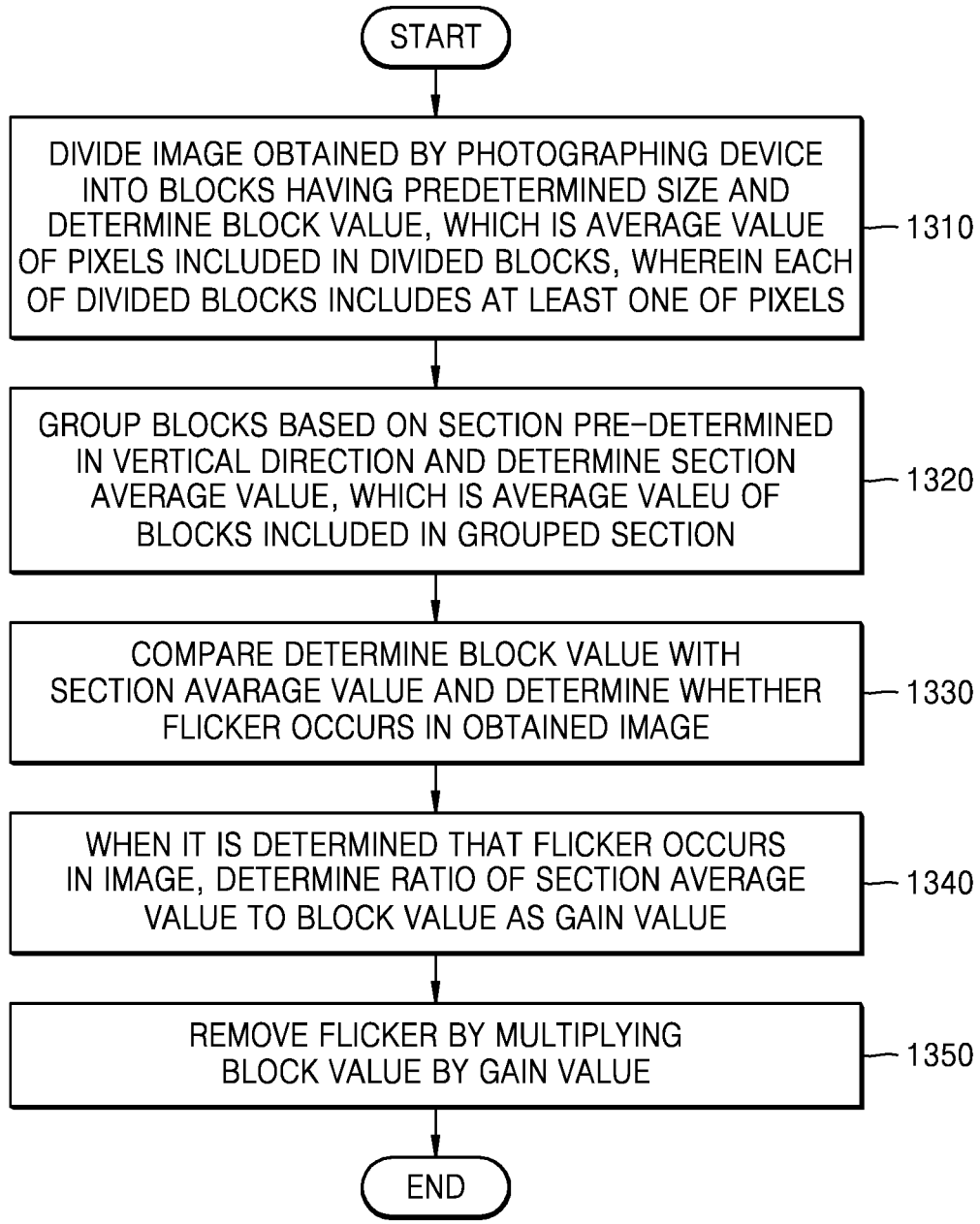
FIG. 13 is a flowchart illustrating an example method of removing a signal indicating a flicker in an image, via an electronic device, according to an example embodiment.

FIG. 13 is a flowchart illustrating an example method of removing a signal indicating a flicker in an image, via the electronic device 600, according to an example embodiment.

In operation 1310, the electronic device 600 (for example, the controller 620) may divide an obtained image into blocks having a pre-determined size and determine a block value, which is an average value of pixels included in the divided blocks, wherein each of the divided blocks includes at least one of the pixels.

Meanwhile, operation 1310 may correspond to operation 910 described earlier with reference to FIG. 9.

In operation 1320, the electronic device 600 (for example, the controller 620) may group the blocks based on a section pre-determined in a vertical direction and determine a section average value, which is an average value of the blocks included in the grouped section.

Meanwhile, operation 1320 may correspond to operation 910 described earlier with reference to FIG. 9.

In operation 1330, the electronic device 600 (for example, the controller 620) may compare a determined block value with the determined section average value to determine whether a flicker occurs in the obtained image. The electronic device 600 (for example, the controller 620) according to an embodiment may determine a ratio between the block value and the section average value. When the ratio between the determined block value and section average value corresponds to a sine wave shape, the electronic device 600 (for example, the controller 620) may determine that a flicker occurs in the obtained image.

In operation 1340, the electronic device 600 (for example, the controller 620) may determine a ratio of the section average value to the block value as a gain value, as it is determined that a flicker occurs in the image.

The electronic device 600 (for example, the controller 620) according to an embodiment may determine the ratio of the section average value to the block value and determine the determined ratio as the gain value, in order to remove the flicker in the image.

In operation 1350, the electronic device 600 (for example, the controller 620) may remove the flicker by performing an operation of multiplying the pixel values of the blocks in the image by the gain value.

When a flicker occurs in the image, the electronic device 600 (for example, the controller 620) according to an embodiment may remove the flicker in the image by performing the operation of multiplying the pixel values of the blocks in the image by the gain value which is determined based on the ratio of the section average value to the block value. Here, the gain value, by which the pixel values of the blocks are multiplied, may be the same for each row unit of the blocks included in the image.

Figure 14:
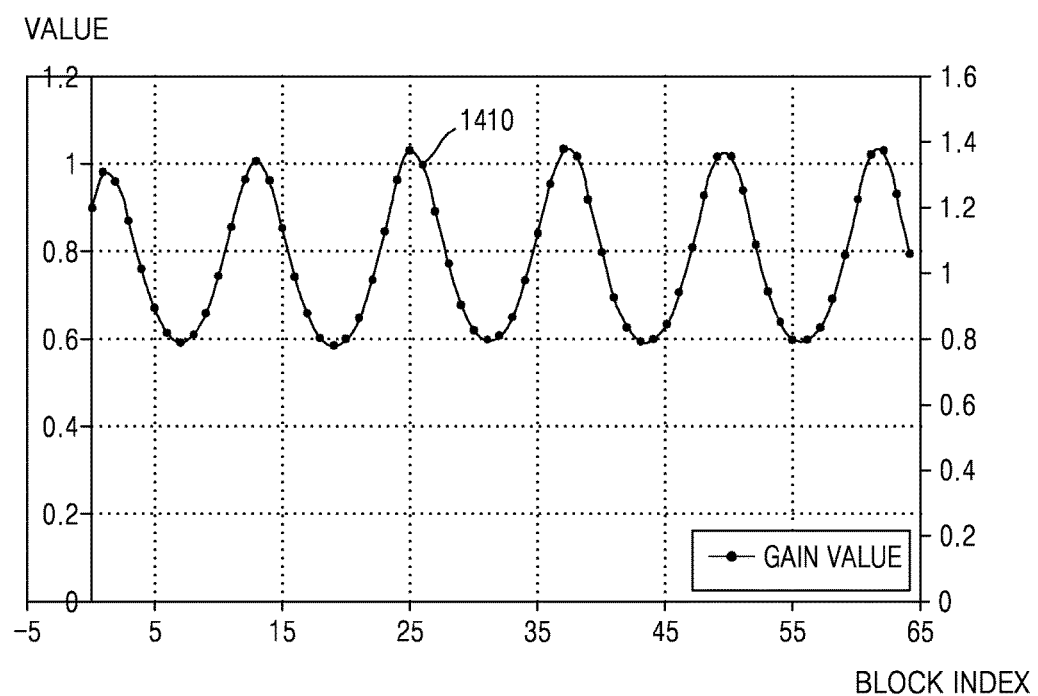
FIG. 14 is a graph illustrating a gain value determined by an electronic device to remove flickers, according to an example embodiment.

FIG. 14 is a graph illustrating a gain value 1410 determined by the electronic device 600 to remove a flicker, according to an example embodiment.

When it is determined that a flicker occurs in the obtained image, the electronic device 600 may determine the gain value 1410 which is determined based on the ratio of the section average value to the block value, to remove the flicker. Referring to FIG. 14, it is seen that the gain value 1410 determined by the electronic device 600 (for example, the controller 620) has a sine wave shape. The electronic device 600 may remove the flicker in the image by performing an operation of multiplying each of the block values of the blocks included in the image by the determined gain value 1410.

Figure 15:
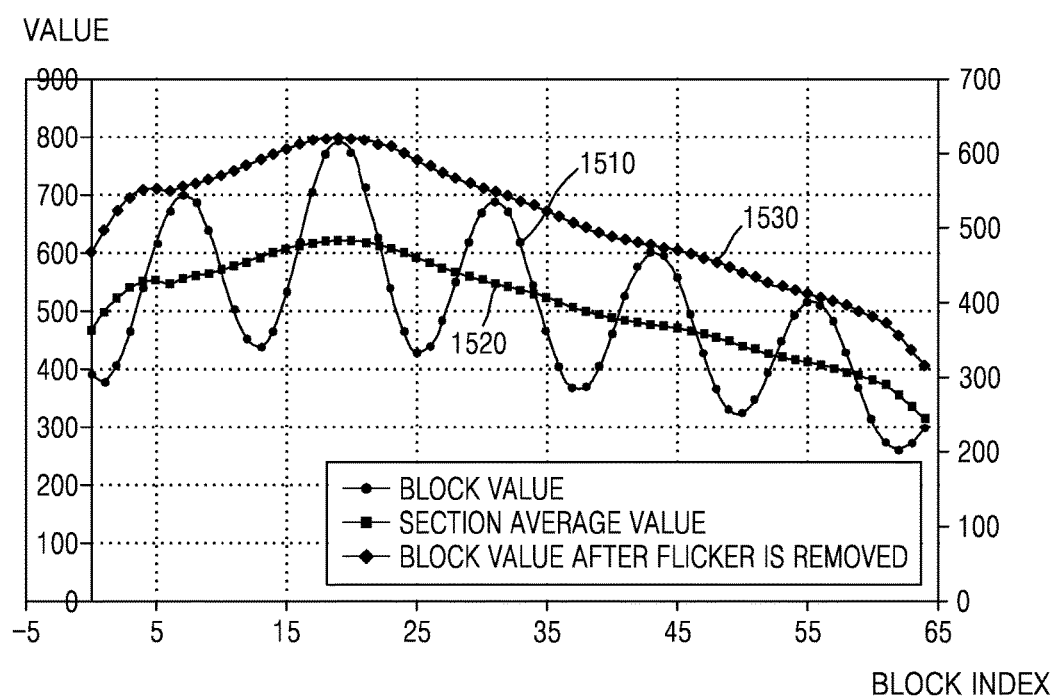
FIG. 15 is a graph illustrating a block value, a section average value, and a block value after flickers are removed, determined by an electronic device, according to an example embodiment.

FIG. 15 is a graph illustrating a block value 1510, a section average value 1520, and a block value 1530 after a flicker is removed, determined by the electronic device 600, according to an example embodiment.

The electronic device 600 according to an embodiment may determine the block value 1510 of each of a plurality of blocks included in an image, in order to identify whether a flicker occurs in the image. Also, the electronic device 600 may move the blocks in the image in a vertical direction, and sequentially group the blocks included in a pre-determined section, based on a selected block. For example, when there are twelve pre-determined sections, the electronic device may move the blocks in the image in the vertical direction and sequentially group twelve blocks, based on selected blocks. Also, the electronic device may determine a section average value 1520, which is an average value of the grouped blocks. FIG. 14 shows a waveform of the block value and the section average value determined by the electronic device 600 (for example, the controller 620) with respect to the blocks included in the image.

The electronic device 600 (for example, the controller 620) according to an embodiment may determine that a flicker occurs in the image, since a ratio between the block value 1510 of the image and the section average value 1520 corresponds to a sine wave shape. Accordingly, the electronic device 600 (for example, the controller 620) may determine a gain value which is determined based on a ratio of the section average value 1520 to the block value 1510. The electronic device 600 may remove the flicker in the image by performing an operation of multiplying the block value of each of the blocks included in the image by the determined gain value. Referring to FIG. 15, it is seen that a signal indicating the block value 1530 of the image after the flicker is removed does not correspond to a sine wave shape.

Figure 16:
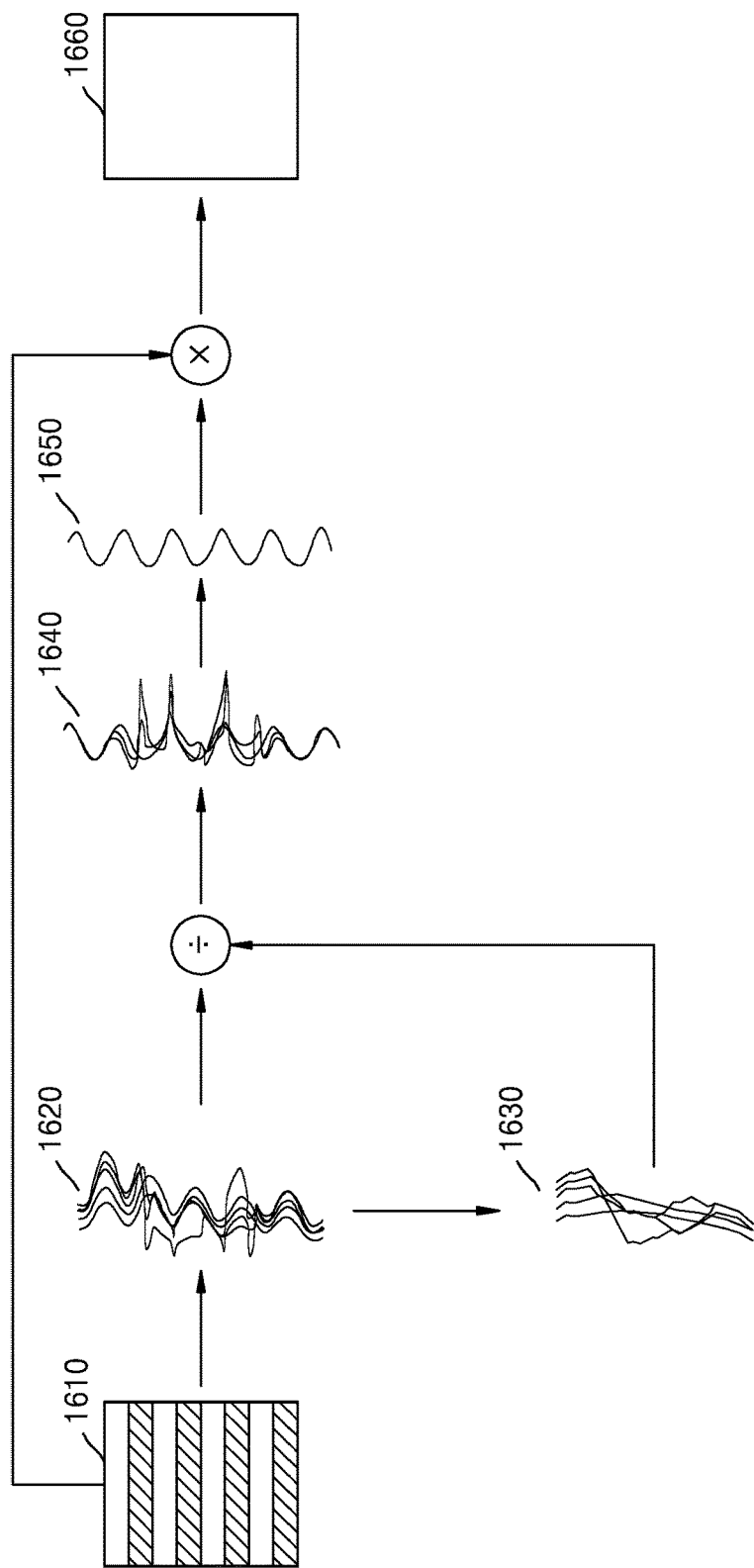
FIG. 16 is a diagram illustrating an example method of removing flickers from an image in which the flickers occur, via an electronic device, according to an example embodiment.

FIG. 16 is a diagram illustrating an example method of removing a flicker in an image in which the flicker occurs, via the electronic device 600, according to an example embodiment.

The electronic device 600 (for example, the controller 620) according to an embodiment may obtain an image 1610 in response to a user input or automatically. The electronic device 600 (for example, the controller 620) may determine a block value 1620 of the obtained image. Also, the electronic device 600 (for example, the controller 620) may group the blocks according to a section pre-determined in a vertical direction, and determine a section average value 1630, which is an average value of the grouped blocks.

Also, the electronic device 600 (for example, the controller 620) may determine a ratio 1640 between the block value 1620 and the section average value 1630. Here, when a flicker occurs, a waveform of the determined ratio 1640 may correspond to a sine wave shape.

The electronic device 600 (for example, the controller 620) may obtain a gain value 1650, which is most approximate to the sine wave shape, from among M determined ratios 1640.

When the determined ratio 1640 corresponds to the sine wave shape, the electronic device 600 (for example, the controller 620) may determine the gain value 1650, which is a ratio of the section average value 1630 to the block value 1620. The electronic device 600 (for example, the controller 620) may obtain an image 1660 in which the flicker is removed, by performing an operation of multiplying each of the blocks included in the obtained image 1610 by the determined gain value 1650.

Figure 17:
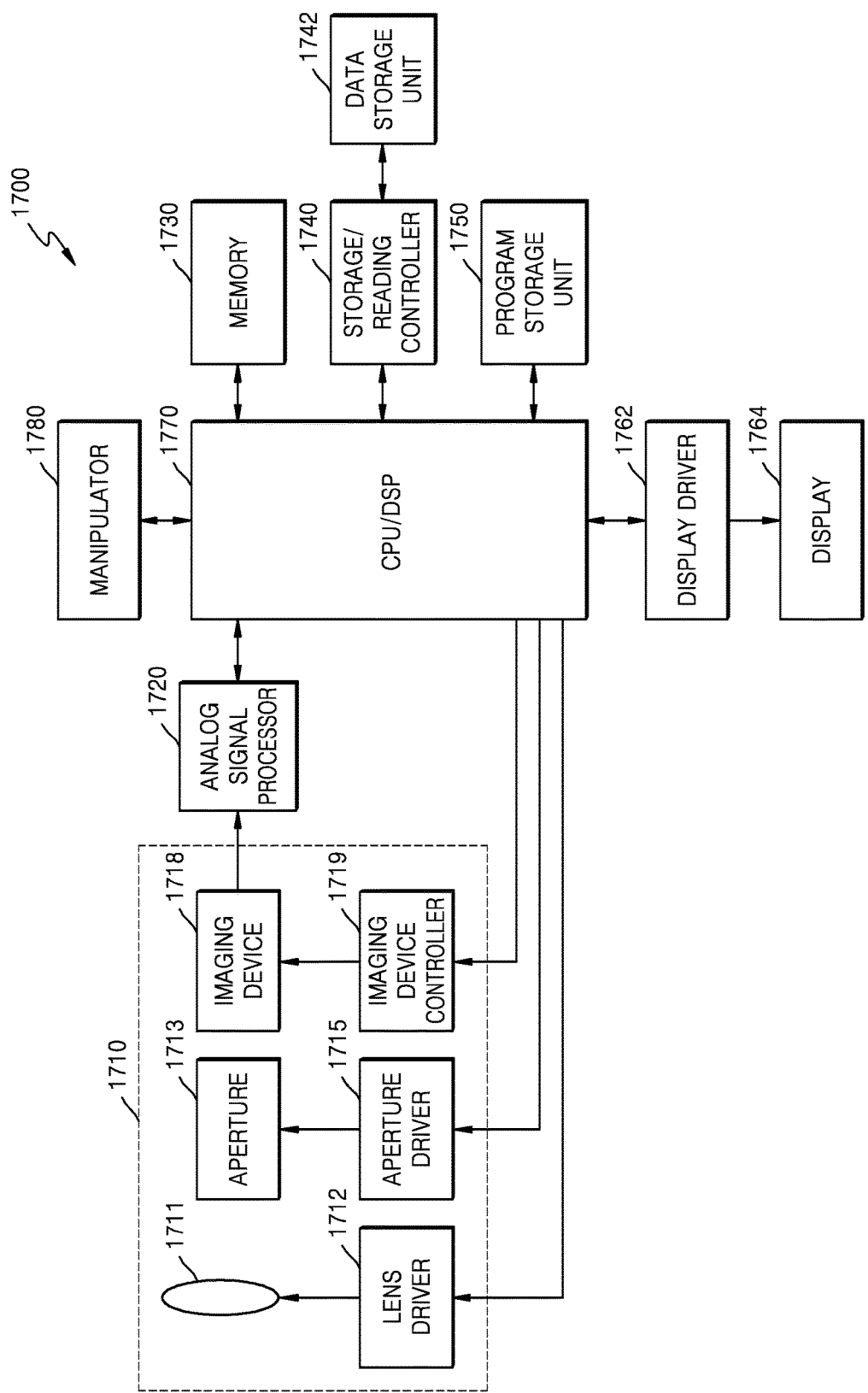
FIG. 17 is a block diagram illustrating an example structure of an electronic device according to another example embodiment.

FIG. 17 is a block diagram illustrating an example electronic device 1700 according to another example embodiment.

The electronic device 1700 according to the present embodiment may include an imaging unit (e.g., including various imaging circuitry) 1710, an analog signal processor (e.g., including processing circuitry) 1720, a memory 1730, a storage/reading controller (e.g., including controller circuitry) 1740, a data storage unit 1742, a program storage unit 1750, a display driver 1762, a display 1764, a CPU/DSP (e.g., including processing circuitry) 1770, and a manipulator (e.g., including input circuitry) 1780.

All operations of the electronic device 1700 are controlled by the CPU/DSP 1770. The CPU/DSP 1770 provides a control signal to a lens driver 1712, an aperture driver 1715, and an imaging device controller 1719 for operations thereof.

The imaging unit 1710 is a unit configured to generate an image of an electrical signal from incident light, and includes various image capturing circuitry and element, such as, for example, and without limitation, a lens 1711, the lens driver 1712, an aperture 1713, the aperture driver 1715, an imaging device 1718, and the imaging device controller 1719.

The lens 1711 may include a plurality of groups or pieces of lenses. A position of the lens 1711 is adjusted by the lens driver 1712. The lens driver 1712 may adjust the position of the lens 1711 according to the control signal provided by the CPU/DSP 1770.

A degree of openness of the aperture 1713 is adjusted by the aperture driver 1715, and the aperture 1713 adjusts the amount of light that is incident to the imaging device 1718.

An optical signal that transmits through the lens 1711 and the aperture 1713 reaches a light-interception surface of the imaging device 1718 and forms an image of a subject. The imaging device 1718 may include a charge-coupled device (CCD) image sensor that converts an optical signal to an electrical signal or a complementary metal oxide semiconductor image sensor (CIS), or the like, but is not limited thereto. A sensitivity of the imaging device 1718 may be adjusted via the imaging device controller 1719. The imaging device controller 1719 may control the imaging device 1718 based on a control signal generated automatically in response to an image signal that is input in real time, or a control signal that is manually input via user manipulation.

Light exposure time of the imaging device 1718 may be adjusted by a shutter (not shown). The shutter (not shown) may include a mechanical shutter that adjusts light that is incident by moving a shade, and an electrical shutter that controls light exposure by supplying an electrical signal to the imaging device 1718.

The analog signal processor 1720 may include various processing circuitry that perform noise reduction, gain adjustment, waveform standardization, analog-digital conversion, etc. on an analog signal supplied from the imaging device 1718.

The signal processed by the analog signal processor 1720 may be input to the controller 1770 through the memory 1730, or may be input to the CPU/DSP 1770 without passing through the memory 1730. The memory 1730 operates as a main memory of the electronic device 1700, and temporarily stores information that is necessary while the CPU/DSP 1770 operates. The memory 1730 stores programs, such as an OS for driving the electronic device 1700, an application system, etc.

In addition, the electronic device 1700 includes the display 1764 for displaying an operational state of the electronic device 1700 or information regarding an image captured by the electronic device 1700. The display 1764 may provide visual information and/or audio information to a user. The display 1764 may include, for example, an LCD panel, an OLED panel, etc., to provide visual information. Also, the display 1764 may include a touch screen for recognizing a touch input.

The display driver 1762 provides a driving signal to the display 1764.

The CPU/DSP 1770 may include various processing circuitry and processes an image signal that is input thereto, and controls the components of the electronic device 1700 according to the processed image signal or an external input signal. The CPU/DSP 1770 may reduce noise with respect to input image data, and perform image signal processing operations to improve image quality, such as gamma correction, color filter array interpolation, color matrix, color correction, color enhancement, etc. Also, the CPU/DSP 1770 may generate an image file by compressing image data generated by performing the image signal processing operation to improve image quality, or may restore image data from the image file. The compression format of the image may be a reversible format or an irreversible format. For example, in the case of a static image, a joint photographic experts group (JPEG) format or a JPEG 2000 format may be possible. Also, when a video is recorded, a video file may be generated by compressing a plurality of frames according to the moving picture experts group (MPEG) standards. The image file may be generated, for example, by the exchangeable image file format (Exif) standards.

The image data that is output from the CPU/DSP 1770 may be input to the storage/reading controller 1740 via the memory 1730 or directly, and the storage/reading controller 1740 may store the image data to the data storage unit 1742 in response to a signal from a user, or automatically. The storage/reading controller 1740 may read data related to an image, from the image file stored to the data storage unit 1742, and input the read data to the display driver 1762 via the memory 1730 or other paths, so that the display 1764 displays the image. The data storage unit 1742 may be detachably attached to the electronic device 1700.

Also, the CPU/DSP 1770 may perform unsharpness processing, color processing, blur processing, edge enhancement processing, image interpretation processing, image recognition processing, image effect processing, etc. As an example of the image recognition processing, facial recognition, scene recognition, etc. may be performed. Also, the CPU/DSP 1770 may perform display image signal to display an image on the display 1764. For example, the CPU/DSP 1770 may perform brightness level adjustment, color compensation, contrast adjustment, outline enhancement adjustment, screen division processing, character image generation, etc., and synthesis of an image. The CPU/DSP 1770 may be connected to an external monitor, and may perform pre-determined image signal processing so that the image is displayed on the external monitor. Also, the CPU/DSP 1770 may transmit the processed image data to the external monitor so that the image is displayed on the external monitor.

The CPU/DSP 1770 may execute a program stored in the memory 1730, or include an additional module configured to generate a control signal for controlling auto focusing, zoom alteration, focus alteration, automatic exposure correction, etc., and to provide the control signal to the aperture driver 1715, the lens driver 1712, and the imaging device controller 1719, thereby generally controlling operations of the components of the electronic device 1700, such as the shutter, the strobe, etc.

The CPU/DSP 1770 according to an embodiment divides the image obtained by the imaging unit 1710 into blocks having a pre-determined size. The CPU/DSP 1770 calculates a block value, which is an average value of pixels included in the divided blocks, wherein each of the blocks includes at least one of the pixels. Also, the CPU/DSP 1770 groups the blocks based on a section that is pre-determined in a vertical direction, and calculates a section average value, which is an average value of the blocks included in the grouped section.

The CPU/DSP 1770 according to an embodiment may compare the calculated block value with the calculated section average value to determine whether a flicker occurs in the obtained image. When a flicker occurs in the image, the CPU/DSP 1770 according to an embodiment may remove the flicker in the image by using a ratio of the section average value to the block value.

The manipulator 1780 is a unit to which a user may input a control signal. The manipulator 1780 may include various input circuitry, including function buttons, such as, for example, and without limitation, a shutter-release button via which a shutter-release signal is input to expose the imaging device 1718 to light for a pre-determined time to capture an image, a power button via which a control signal is input to control power on and off, a zoom button for widening or narrowing an angle of an image, a mode selection button, and other photographing setting value adjustment buttons. The manipulator 1780 may be realized as various shapes, via which a user may input a control signal. For example, the manipulator 1780 may be realized as various input circuitry, such as, for example, and without limitation, a button, a keyboard, a touch pad, a touch screen, a remote controller, etc.

The imaging unit 1710 of FIG. 17 may correspond to the camera module 610 of FIG. 6. The CPU/DSP 1770 of FIG. 17 may correspond to the processor 620 of FIG. 6.

The electronic device 1700 of FIG. 17 is an example embodiment of the present disclosure, and the electronic device 1700 according to the present disclosure is not limited to the electronic device 1700 illustrated in FIG. 17.

As described above, according to the one or more of the above embodiments, a flicker included in an image may be easily removed using only one image obtained by an electronic device, and thus, an image having improved image quality may be provided to a user.

The present disclosure may be realized by a computer-readable storage medium storing computer-readable code. The computer-readable storage medium includes all types of non-transitory storage devices in which data that may be read by a computer system is stored.

The computer-readable code is configured to perform operations of the method of controlling the electronic device according to the present disclosure, when the computer-readable code is read from the computer-readable storage medium and executed by a processor. The computer-readable code may include various programming languages. Functional programs, code, and code segments for embodying the present disclosure may be easily derived by programmers in the art to which the present disclosure belongs.

Examples of the computer-readable recording medium may include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

It should be understood that various example embodiments described herein should be considered in a descriptive sense only and not for purposes of limitation. Descriptions of features or aspects within each example embodiment should typically be considered as available for other similar features or aspects in other embodiments.

While various example embodiments have been described with reference to the figures, it will be understood by those of ordinary skill in the art that various changes in form and details may be made therein without departing from the spirit and scope as defined by the following claims.

What is claimed is:

1. A method of processing an image obtained by a camera, the method comprising:
    obtaining the image using an image sensor;
    identifying an image signal in a direction perpendicular to a line scan direction of the image sensor, with respect to at least one region of the image;
    determining an average of the image signal as a reference signal;
    detecting a signal indicating a flicker based on a ratio of the image signal to the reference signal; and
    generating an image in which a flicker is corrected, based on the signal indicating a flicker and the image.

2. The method of claim 1, wherein the identifying of the image signal comprises:
    dividing the at least one region of the image into a plurality of blocks, and
    identifying the signal indicating a flicker, by identifying an image signal of at least one of the plurality of blocks.

3. The method of claim 2, wherein the dividing of the at least one region of the image comprises dividing the image into a first number of blocks in a vertical direction and a second number of blocks in a horizontal direction, wherein the first number is set to be greater than a number of lines in which flicker occurs.

4. The method of claim 1, further comprising:
    comparing the image signal with the reference signal.

5. The method of claim 1, wherein the detecting of the signal comprises:
    determining the signal indicating a flicker from the image signal, when the ratio of the image signal to the reference signal corresponds to a sine wave shape.

6. The method of claim 1, wherein the generating of the image comprises:
    identifying a gain signal with respect to the signal indicating a flicker, and
    generating the image in which a flicker is corrected, by multiplying the image signal by the gain signal.

7. The method of claim 6, wherein the generating of the image comprises:
    determining the gain signal based on a ratio of the reference signal to the image signal.

8. The method of claim 1, wherein the generating of the image is performed together with correcting a lens shading phenomenon of the image.

9. An electronic device configured to process an image obtained by a camera, the electronic device comprising:
    an image sensor configured to obtain the image; and
    a controller configured to identify an image signal in a direction perpendicular to a line scan direction of the image sensor with respect to at least one region of the image, to determine an average of the image signal as a reference signal, to detect a signal indicating a flicker based on a ratio of the image signal to the reference signal, and to generate an image in which a flicker is corrected, based on the signal indicating a flicker and the image.

10. The electronic device of claim 9, wherein the controller is configured to divide the at least one region of the image into a plurality of blocks, and to identify the signal indicating a flicker by identifying an image signal of at least one of the plurality of blocks.

11. The electronic device of claim 10, wherein the controller is configured to divide the image into a first number of blocks in a vertical direction and a second number of blocks in a horizontal direction, wherein the first number is set to be greater than the number of lines in which flickers occur.

12. The electronic device of claim 9, wherein the controller is configured to compare the image signal with the reference signal.

13. The electronic device of claim 9, wherein the controller is configured to determine the signal indicating a flicker from the image signal, when the ratio of the image signal to the reference signal corresponds to a sine wave shape.

14. The electronic device of claim 9, wherein the controller is configured to identify a gain signal with respect to the signal indicating a flicker, and to generate the image in which a flicker is corrected by multiplying the image signal by the gain signal.

15. The electronic device of claim 14, wherein the controller is configured to determine the gain signal based on a ratio of the reference signal to the image signal.

16. The electronic device of claim 9, wherein the controller is configured to generate the image in which a flicker is corrected, while correcting a lens shading phenomenon of the image.

17. A non-transitory computer-readable recording medium having recorded thereon a computer program for executing the method of claim 1.

* * * * *